(12) United States Patent
Sharma et al.

(10) Patent No.: US 12,110,258 B2
(45) Date of Patent: *Oct. 8, 2024

(54) COATED FERTILIZER CONTAINING UREASE INHIBITOR

(71) Applicant: SABIC Agri-Nutrients Company, Jubail (SA)

(72) Inventors: Yogesh Omprakash Sharma, Bangalore (IN); Nilkamal Bag, Bangalore (IN); Srinivasa Rao Boddu, Bangalore (IN); Samik Gupta, Bangalore (IN); Khalid Al-Rohily, Riyadh (SA)

(73) Assignee: SABIC AGRI-NUTRIENTS COMPANY, Jubail (SA)

( * ) Notice: Subject to any disclaimer, the term of this patent is extended or adjusted under 35 U.S.C. 154(b) by 557 days.

This patent is subject to a terminal disclaimer.

(21) Appl. No.: 17/295,096

(22) PCT Filed: Nov. 18, 2019

(86) PCT No.: PCT/IB2019/059888
§ 371 (c)(1),
(2) Date: May 19, 2021

(87) PCT Pub. No.: WO2020/104916
PCT Pub. Date: May 28, 2020

(65) Prior Publication Data
US 2022/0098125 A1    Mar. 31, 2022

Related U.S. Application Data

(60) Provisional application No. 62/769,672, filed on Nov. 20, 2018.

(51) Int. Cl.
*C05G 1/00*    (2006.01)
*A01C 21/00*    (2006.01)
(Continued)

(52) U.S. Cl.
CPC ............... *C05G 1/00* (2013.01); *A01C 21/00* (2013.01); *C05B 1/02* (2013.01); *C05C 9/00* (2013.01);
(Continued)

(58) Field of Classification Search
None
See application file for complete search history.

(56) References Cited

U.S. PATENT DOCUMENTS

| 2,722,456 A | 11/1955 | Glessner |
| 2,909,002 A | 10/1959 | Hendry |

(Continued)

FOREIGN PATENT DOCUMENTS

| AU | 2006207855 | 3/2007 |
| AU | 2018201274 | 3/2018 |

(Continued)

OTHER PUBLICATIONS

Brown, Brad et al. "Nutrient Management for Field Corn Silage and Grain in the Inland Pacific Northwest". University of Idaho. PNW 615 (Feb. 2010) (Year: 2010).

(Continued)

*Primary Examiner* — Wayne A Langel
(74) *Attorney, Agent, or Firm* — Norton Rose Fulbright US LLP

(57) ABSTRACT

Magnesium oxide, urease inhibitor, and superphosphate coated urea-based fertilizer core, methods for their use, and production thereof, are disclosed. The coating can be a powder coating containing particles that are 1 micron to 100 microns in average mean diameter. The fertilizer core, coated by the magnesium oxide, urease inhibitor, and superphosphate coating, can contain 50 wt. % or more, based on the total weight of the core, of a urea-based fertilizer, such (Continued)

as urea. The coating can optionally contain or exclude anticaking agent(s), and/or binding agent(s).

20 Claims, 3 Drawing Sheets

(51) Int. Cl.
  *C05B 1/02* (2006.01)
  *C05C 9/00* (2006.01)
  *C05D 5/00* (2006.01)
  *C05G 3/90* (2020.01)
  *C05G 5/35* (2020.01)

(52) U.S. Cl.
  CPC .............. *C05D 5/00* (2013.01); *C05G 3/90* (2020.02); *C05G 5/35* (2020.02)

(56) References Cited

U.S. PATENT DOCUMENTS

| | | |
|---|---|---|
| 3,223,518 A | 12/1965 | Hansen |
| 3,313,615 A | 4/1967 | Formaini |
| 3,392,007 A | 7/1968 | Hopewell et al. |
| 3,419,379 A | 12/1968 | Goodale et al. |
| 3,423,199 A | 1/1969 | Philen et al. |
| 3,580,715 A | 5/1971 | Dilday |
| 3,666,523 A | 5/1972 | Nau |
| 3,697,245 A | 10/1972 | Dilday |
| 3,938,469 A | 2/1976 | Nau |
| 4,042,366 A | 8/1977 | Fersch et al. |
| 4,594,090 A | 6/1986 | Johnson |
| 4,723,710 A | 2/1988 | Lucore, II |
| 4,917,304 A | 4/1990 | Mazzei et al. |
| 5,152,821 A | 10/1992 | Walter |
| 5,851,260 A | 12/1998 | Aijala et al. |
| 5,917,110 A | 6/1999 | Kust |
| 6,029,904 A | 2/2000 | Taylor |
| 6,030,659 A | 2/2000 | Whitehurst et al. |
| 6,159,263 A | 12/2000 | Greer et al. |
| 6,413,291 B1 | 7/2002 | Wommack et al. |
| 7,393,885 B2 | 7/2008 | Kiyokawa et al. |
| 8,506,670 B2 | 8/2013 | Varadachari |
| 8,721,758 B1 | 5/2014 | Miller et al. |
| 9,004,374 B1 | 4/2015 | Gans |
| 9,073,795 B2 | 7/2015 | Bergevin et al. |
| 9,199,883 B2 | 12/2015 | Peacock et al. |
| 9,439,345 B1 | 9/2016 | Miller et al. |
| 9,487,452 B2 | 11/2016 | Ledoux |
| 9,586,869 B1 | 3/2017 | Burnham et al. |
| 9,688,586 B1 | 6/2017 | Roa-Espinosa et al. |
| 9,856,179 B2 | 1/2018 | Miller et al. |
| 11,155,503 B2 | 10/2021 | Sharma |
| 2002/0186614 A1 | 12/2002 | Millward |
| 2005/0144997 A1 | 7/2005 | Phillips et al. |
| 2006/0254331 A1 | 11/2006 | Burnham |
| 2007/0131009 A1 | 6/2007 | Westbrook et al. |
| 2009/0145190 A1 | 6/2009 | Persinger |
| 2010/0273885 A1 | 10/2010 | Davis |
| 2010/0291230 A1 | 11/2010 | Assaraf et al. |
| 2011/0079062 A1 | 4/2011 | Smith |
| 2012/0067094 A1* | 3/2012 | Pursell .............. C05B 1/00 71/28 |
| 2014/0238514 A1 | 8/2014 | Yarbrough et al. |
| 2014/0352376 A1 | 12/2014 | Carpenter |
| 2015/0027042 A1 | 1/2015 | Goodwin et al. |
| 2015/0210604 A1 | 7/2015 | Ledoux |
| 2015/0239790 A1 | 8/2015 | Iwig et al. |
| 2016/0060460 A1 | 3/2016 | Welch |
| 2016/0073578 A1 | 3/2016 | Khaleel |
| 2016/0075607 A1 | 3/2016 | Aqel et al. |
| 2016/0229763 A1 | 8/2016 | Wheeler et al. |
| 2016/0318820 A1 | 11/2016 | Deb |
| 2017/0044078 A1 | 2/2017 | McLaughlin et al. |
| 2017/0066692 A1 | 3/2017 | Ledoux |
| 2017/0066693 A1 | 3/2017 | Ledoux |
| 2018/0222810 A1 | 8/2018 | Schumski |
| 2018/0370864 A1 | 12/2018 | Ledoux |
| 2019/0194084 A1 | 6/2019 | Khaleel |
| 2019/0225557 A1 | 7/2019 | Colpaert et al. |
| 2019/0382321 A1 | 12/2019 | Garnier et al. |
| 2020/0131098 A1 | 4/2020 | Hedge et al. |

FOREIGN PATENT DOCUMENTS

| | | | |
|---|---|---|---|
| CA | 2995400 | 2/2017 | |
| CH | 497353 A | 10/1970 | |
| CH | 425702 | 12/1996 | |
| CN | 1292367 | 4/2001 | |
| CN | 1609072 | 4/2005 | |
| CN | 1875688 | 12/2006 | |
| CN | 100407898 | 12/2006 | |
| CN | 101077844 | 11/2007 | |
| CN | 201773293 | 3/2011 | |
| CN | 102372523 | 3/2012 | |
| CN | 102432403 | 5/2012 | |
| CN | 102515905 | 6/2012 | |
| CN | 102775217 | 11/2012 | |
| CN | 103848683 | 6/2014 | |
| CN | 104130043 | 11/2014 | |
| CN | 104557337 | 4/2015 | |
| CN | 105143150 | 12/2015 | |
| CN | 105949010 | 9/2016 | |
| CN | 206375831 | 8/2017 | |
| CN | 108137429 | 6/2018 | |
| CN | 108191491 | 6/2018 | |
| CN | 109641813 | 4/2019 | |
| DE | 102009026234 | 2/2011 | |
| EP | 0949221 | 10/1999 | |
| EP | 1080054 | 12/2003 | |
| EP | 1473992 | 11/2004 | |
| EP | 1486477 | 12/2004 | |
| EP | 1770079 | 4/2007 | |
| EP | 3330241 | 6/2018 | |
| FR | 2682554 | 4/1993 | |
| FR | 2686861 | 8/1993 | |
| GB | 954423 | 4/1964 | |
| JP | 2002316888 | 10/2002 | |
| RU | 2010024 C1 | 3/1994 | |
| RU | 2412140 | 2/2011 | |
| WO | WO 1993/010062 | 5/1993 | |
| WO | WO 1999/015480 | 4/1999 | |
| WO | WO 2001/025168 | 4/2001 | |
| WO | WO 2012/064730 | 5/2012 | |
| WO | WO 2014/033160 | 3/2014 | |
| WO | WO 2014/177932 | 11/2014 | |
| WO | WO 2015/001391 A1 * | 1/2015 | ............ C05C 9/00 |
| WO | WO 2015/132258 | 9/2015 | |
| WO | WO 2017/013572 | 1/2017 | |
| WO | WO 2017/081183 | 5/2017 | |
| WO | WO 2017/081183 A1 * | 5/2017 | ............ C05C 9/00 |
| WO | WO 2017/198693 A1 * | 11/2017 | ............ C05D 9/00 |
| WO | WO 2018/042312 | 3/2018 | |
| WO | WO 2018/211448 | 11/2018 | |
| WO | WO 2020/000022 | 1/2020 | |
| WO | WO 2020/104914 | 5/2020 | |
| WO | WO 2020/121222 | 6/2020 | |

OTHER PUBLICATIONS

Chemical Book. "Sulfuric acid" https://www.chemicalbook.com/ChemicalProductProperty_EN_CB9675634.htm Jan. 16, 1998.
Crop Nutrition. "Monoammonium Phosphate (MAP)" https://www.cropnutrition.com/resource-library/monoammonium-phosphate-map Sep. 21, 2020.
International Search Report and Written Opinion issued in International Patent Application No. PCT/IB2021/061966, dated Mar. 17, 2022.
The Berkey "What is the pH Level of Water? For Tap, Pure, And Filtered Drinking Water". <https://theberkey.com/blogs/water-filter/why-ph-level-in-your-water-matters> Feb. 22, 2020 (Year: 2020).
Vitosh, M. L. NPK fertilizers. Cooperative Extension Service, Michigan State University, 1990. (Year: 1990).

(56) References Cited

OTHER PUBLICATIONS

"Monoammonium PHosphate (MAP)." *Crop Nutrition*, Sep. 21, 2020, https://www.cropnutrition.com/resource-library/monoammonium-phosphate-map.
"NPK Fertilizers—Mixed Acid Route." Lecture Book from NPTEL programme, http://nptel.ac.in/courses/103/107/103107086/. Accessed Jun. 16, 2021, 9 pages.
"Poly-Feed pHast—Soluble NPK Fertilizers with low pH," Haifa Group, https://www.haifa-group.com/poly-feed%E2%84%A2-phast, Date Accessed: Sep. 2, 2020.
"Production of NPK Fertilizers by the Mixed Acid Route," *European Fertilizer Manufactures Association*, 2000, Booklet No. 8, 1-36.
"Sulfuric Acid." *Chemical Book*, Jan. 16, 1998, https://www.chemicalbook.com/ChemicalProductProperty_EN_CB9675634.hlm.
Burt, "Chemicals for Fertigation," Proc Intl. Irrigation Show: IA's 19th Annual Conference, 1998, 8 pages.
Database WPI; Week 200311 Thomson Scientific, London, GB; AN 2003-116042.
House, "Phosphorus, Arsenic, Antimony, and Bismuth," *Inorganic Chemistry*, 2013, 2:493.
International Search Report and Written Opinion issued in Corresponding PCT Application No. PCT/IB2019/059888, dated Feb. 20, 2020.
International Search Report and Written Opinion issued in counterpart International Patent Application No. PCT/IB2018/053475, dated Aug. 1, 2018.
International Search Report and Written Opinion issued in International Patent Application No. PCT/IB2017/055158, dated Nov. 24, 2017.
International Search Report and Written Opinion issued in International Patent Application No. PCT/IB2019/060671, dated Mar. 10, 2020.
International Search Report and Written Opinion issued in International Patent Application No. PCT/IB2014/001392, dated Dec. 10, 2014.
Mosaic, "MicroEssentials SZ" MSDS Revised, dated Dec. 21, 2012.
Office Action issued in corresponding Chinese Application No. 201480023254.3, dated Nov. 1, 2017.
Office Action issued in corresponding Chinese Patent Application No. 2017800529356, dated Mar. 2, 2021 (English Translation provided).
Office Action issued in corresponding European Patent Application No. 14759270.3, dated May 3, 2018.
Office Action issued in corresponding European Patent Application No. 14759270.3, dated Nov. 24, 2017.
Office Action issued in corresponding GCC Patent Application No. 2017-33903, dated Nov. 8, 2020.
International Search Report and Written Opinion issued in corresponding PCT Application No. PCT/IB2021/056304, mailed Oct. 6, 2021.
Communication pursuant to Article 94(3) EPC issued in corresponding European Application No. 19824011.1, dated Jan. 2, 2024.
Kant, S. et al., "Fertigation", Reference Module in Earth Systems and Environmental Sciences, 2013.
Office Action issued in corresponding Chinese Application No. 2021180062071.2, dated Jul. 23, 2024. (Chinese Only).

\* cited by examiner

COATED FERTILIZER CONTAINING UREASE INHIBITOR

CROSS REFERENCE TO RELATED PATENT APPLICATIONS

This application is a national phase application under 35 U.S.C. § 371 of International Application No. PCT/IB2019/059888, filed Nov. 18, 2019, which claims priority to and the benefit of U.S. Provisional Application No. 62/769,672, filed Nov. 20, 2018, the entire contents of each of which are incorporated into the present application by reference in their entirety.

BACKGROUND OF THE INVENTION

A. Field of the Invention

The invention generally concerns a magnesium oxide, urease inhibitor, and superphosphate coated fertilizer. Such a coated fertilizer can have improved physical and/or chemical properties that can be beneficial for the agricultural industry.

B. Description of Related Art

Soil nutrients, such as nitrogen, phosphorus, potassium, as well as other elements such as sulfur, iron, zinc, copper, and magnesium, are useful for achieving thriving agriculture and growth of plants. Upon repeated planting cycles, the quantity of these nutrients in the soil may be depleted, resulting in inhibited plant growth and decreased production. To counter this effect, fertilizers have been developed to help replace the depleted vital nutrients and to create the right balance of nutrients.

However, continuous use of fertilizer can lead to nutrient imbalance and loss of soil fertility. In addition, extensive use of ammonium and urea-based fertilizers, due to their rapid degradation by volatilization and nitrate leaching can cause deterioration of soil health, loss of fertilizer, and other environmental problems such as greenhouse emissions and groundwater contamination.

Degradation of ammonium and urea-based fertilizers in soil can be counteracted by adding urease inhibitors to the fertilizer. Urease inhibitors reduce the amount of urea hydrolyzed, which reduces the amount of nitrogen lost through ammonia volatilization.

While use of urease inhibitors in fertilizers has been employed as a solution to the problems of urea degradation and loss, there are certain difficulties in using these inhibitors. One problem is that some inhibitors are heat sensitive, which complicates the manufacturing process for fertilizers that include such inhibitors. For example, adding a heat-sensitive inhibitor to molten urea before granulation can cause substantial degradation of the inhibitor, as described in WO 2017/013572. To compensate for this problem, some fertilizer manufacturers may add an excess of inhibitor to the urea melt, which increases the cost of producing the fertilizer. Others have combined granules of inhibitors (coated or un coated) with granules of urea (coated or uncoated) in fertilizer blends (WO 2017/081183) or applied aqueous slurries to coat urea (AU 2018/201274 and AU2006207855). An issue with these fertilizer blends is potentially uneven distribution of the inhibitor granules with respect to the urea granules. An issue with the use of aqueous slurries is that they tend to lead to caking of the urea granules. Slurries also can add a level of manufacturing complexity, as liquid handling can be costly and time consuming, and the liquid (e.g., water) can be contaminated with unwanted impurities.

Thus, improved fertilizers that reduce urea degradation, reduce costs, reduce complexity, and reduce application burdens are still needed.

SUMMARY OF THE INVENTION

A solution has been discovered to at least some of the aforementioned problems associated with currently available fertilizers. The solution is premised on the development of a coated fertilizer having a fertilizer core containing a urea-based fertilizer and a powder coating containing particles of magnesium oxide, particles of a urease inhibitor, and particles of a superphosphate. The coated fertilizer has desirable physical, chemical, and plant growth properties and can be produced, transported, and applied in a less complex, less costly, and more convenient manner when compared with the currently available fertilizers. Further, the coated fertilizer can provide greater stability, stability for longer periods of time, improved abrasion resistance, and additional nutrients not found in the individual ingredients alone. These nutrients can be provided in a single application by using the coated fertilizers described herein. The coating of the present invention provides inhibitor stability for much longer and under harsher conditions when compared with currently available fertilizers. The improved stability of the inhibitor in turn increases the availability of nitrogen to plants and uptake of said nitrogen into plants from the coated fertilizers. In addition, the coated fertilizer of the present invention can be produced in a process at room temperature (e.g., 15° C. to 35° C.) or temperatures lower than the temperatures wherein urea melts (130 to 135° C.) or some ureases start to decompose (70° C.). The coated fertilizer of the present invention also does not require use of a slurry to coat the core. This reduces the caking tendency of urea and the other components of the coated fertilizer, such as the superphosphates. It also reduces the complexity of producing the coated fertilizer, as liquid handling is reduced and contaminated water production is decreased.

In one aspect of the present invention, a coated fertilizer is disclosed. The coated fertilizer can contain a fertilizer core containing a urea-based fertilizer and a powder coating containing particles of magnesium oxide, particles of a urease inhibitor, and particles of a superphosphate. The core can contain at least 50, 60, 70, 80, 90, 91, 92, 93, 94, 95, 96, 97, 98, or 99 wt. % of the urea-based fertilizer based on the total weight of the core, including all ranges and subranges there between. In some instances, the fertilizer core consists of or consists essentially of the urea-based fertilizer. In some aspects, the urea-based fertilizer is urea, a salt thereof, and/or an adduct thereof. In some instances, the urea-based fertilizer is urea. In some instances, the urease inhibitor can be N-(n-butyl) thiophosphoric triamide and/or phenylphosphorodiamidate. In some instances, the superphosphate of the powder coating can be single superphosphate (SSP), triple super-phosphate (TSP), or a combination thereof.

The powder coating can contain magnesium oxide particles, urease inhibitor particles, and/or superphosphate particles with a mean average diameter of 1 to 100 microns, 10 to 100 microns, 10 to 90 microns, 1 to 90 microns, 1 to 50 microns, 10 to 50 microns, 20 to 50 microns, 1 to 40 microns, 10 to 40 microns, or 20 to 40 microns, or any range or number therein or there between. Any range between 1 micron to 100 microns is contemplated (e.g., 5, 10, 15, 20, 25, 30, 35, 40, 45, 50, 55, 60, 65, 70, 75, 80, 85, 90, or 95 microns, with 20 to 40 microns being preferred in certain aspects).

In some instances, the coating optionally contains one or more binder(s), and/or one or more anticaking agent(s). In some instances, the coated fertilizer contains a single layer coating. The coated fertilizer optionally can contain one or more additional coatings. The additional coatings can, in some instances, contain one or more binder(s) and/or one or more anticaking agent(s). In some instances, the water contained in the coating(s) can be less than 2%, less than 1%, less than 0.5%, less than 0.1% by weight of the coating or any range or percentage therein or there between. The binder can be guar gum, waxes such as paraffin wax, oils such as linseed oils and paraffin oils, flours and starches such as bleached wheat flour, gelatins, and/or polymers. The anticaking agent can be any anticaking agent known, such as surfactants, amines, liquid carriers such as oil and/or water, and/or a URESOFT® product supplied by Kao Chemicals, such as URESOFT®-125, or any combination thereof.

At least a portion of the core's surface can be in direct contact with the powder coating. In some aspects, the coating is not dispersed throughout the fertilizer core. In some instances, the coating forms a shell at least partially coating the core. The coating can coat at least 50%, 60%, 70%, 80%, or 90%, or more of the surface of the core. In some instances, the coating layer has a mean average thickness of 2 to 200 microns, 2 to 150 microns, 2 to 100 microns, 2 to 80 microns, 2 to 60 microns, 2 to 40 microns, 10 to 200 microns, 10 to 150 microns, 10 to 100 microns, 10 to 80 microns, 10 to 60 microns, 10 to 40 microns, 20 to 200 microns, 20 to 150 microns, 20 to 100 microns, 20 to 80 microns, 20 to 60 microns, or 20 to 40 microns or any range therein.

The coated fertilizer can contain or exclude additional ingredients. The additional ingredients included or excluded can be a preservative, insecticide, fungicide, fragrance, micronutrient, fertilizer, plant growth agent, nutrient, secondary nutrient, trace element, plant protection agent, filler, etc., or a combination thereof. In some instances, the core does not contain an additional ingredient (e.g., consists of urea-based fertilizer). In some instances, the coating does not contain an additional ingredient (e.g., consists of magnesium oxide, one or more urease inhibitor, and one or more superphosphate).

The coating composition of the present invention can contain the components therein at any concentration, ratio, percent by weight, percent by volume, etc. In some instances, the coat of the coated fertilizer composition contains a sufficient amount of the magnesium oxide and the superphosphate in the powder coating to decrease degradation of the urease inhibitor as compared to the fertilizer core coated with only magnesium oxide and the urease inhibitor, or coated with only the urease inhibitor and the superphosphate. In some instances, the coated fertilizer contains 0.0001 wt. %, 0.001 wt. %, 0.01 wt. %, 0.1 wt. %, 0.5 wt. %, 1 wt. %, 1.5 wt. %, 2 wt. %, 2.5 wt. %, 3 wt. %, 3.5 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. %, 95 wt. %, 99 wt. %, or any concentration or range therein, of the individual ingredients in the coating and/or the core based on the total weight of the coated fertilizer. The coated fertilizer can contain 85 wt. %, 90 wt. %, 91 wt. %, 92 wt. %, 93 wt. %, 94 wt. %, 95 wt. %, 96 wt. %, 97 wt. %, 98 wt. %, or 99 wt. %, or any concentration or range therein, of the core based on the total weight of the coated fertilizer. The coated fertilizer can contain 1 wt. %, 1.5 wt. %, 2 wt. %, 2.5 wt. %, 3 wt. %, 3.5 wt. %, 4 wt. %, 5 wt. %, 6 wt. %, 7 wt. %, 8 wt. %, 9 wt. %, 10 wt. %, or any concentration or range therein, of the coating based on the total weight of the coated fertilizer. The coated fertilizer can contain 0.5 wt. %, 1 wt. %, 1.5 wt. %, 2 wt. %, 2.5 wt. %, 3 wt. %, 3.5 wt. %, or any concentration or range therein, of the magnesium oxide in the coating based on the total weight of the coated fertilizer. The coated fertilizer can contain 0.01 wt. %, 0.1 wt. %, 0.5 wt. %, 1 wt. %, or 1.5 wt. %, or any concentration or range therein, of the superphosphate in the coating based on the total weight of the coated fertilizer. The coated fertilizer can contain 0.001 wt. % or less, 0.001 wt. %, 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.5 wt. %, or 1 wt. %, or any concentration or range therein, of the urease inhibitor in the coating based on the total weight of the coated fertilizer.

In some instances, the coating is 0.001 wt. % to 10 wt. %, 0.001 wt. % to 9 wt. %, 0.001 wt. % to 8 wt. %, 0.001 wt. % to 7 wt. %, 0.001 wt. % to 6 wt. %, 0.01 wt. % to 10 wt. %, 0.1 wt. % to 10 wt. %, 0.5 wt. % to 10 wt. %, 0.5 wt. % to 9 wt. %, 0.5 wt. % to 8 wt. %, 0.5 wt. % to 7 wt. %, 0.5 wt. % to 6 wt. %, 1 wt. % to 6 wt. %, or any range therein, of the coated fertilizer based on the total weight of the coated fertilizer. In some instances, the urease inhibitor is contained in the coated fertilizer at 1 wt. % to 0.001 wt. % or 0.1 wt. % to 0.001 wt. % of the coated fertilizer. The coated fertilizer can contain a weight ratio of 2:1, 2.5:1, 2.6:1, 2.7:1, 2.8:1, 2.9:1, 3:1, 4:1, 5:1, 6:1, 6.1:1, 6.2:1, 6.3:1, 6.4:1, 6.5:1, 6.6:1, 6.7:1, 6.8:1, 6.9:1, or 7:1, or any range therein for the magnesium oxide to the superphosphate in the coating. The coated fertilizer can contain a weight ratio of 10:1, 15:1, 20:1, 25:1, 30:1, 35:1, or 40:1 or any range therein for the magnesium oxide to the urease inhibitor in the coating. The coated fertilizer can contain a weight ratio of 2:1, 2.5:1, 2.6:1, 2.7:1, 2.8:1, 2.9:1, 3:1, 4:1, 5:1, 6:1, 6.1:1, 6.2:1, 6.3:1, 6.4:1, 6.5:1, 6.6:1, 6.7:1, 6.8:1, 6.9:1, or 7:1, or any range therein for the superphosphate to the urease inhibitor in the coating.

The coated fertilizer of the present invention can be included with other fertilizers in a fertilizer composition. In some instances, the coated fertilizer is contained in a blended fertilizer or a compounded fertilizer. By way of example, a blended fertilizer composition of the present invention can be formulated into a quick release fertilizer. Alternatively, the blended fertilizer composition can be formulated into a slow-release fertilizer. In some instances, the blended fertilizer composition is formulated into a specialty fertilizer.

Also disclosed in the context of the present invention is a method of producing a coated fertilizer disclosed herein. The method can include contacting the core disclosed herein with a powder coating composition under conditions sufficient to form a powder coated fertilizer. Contacting the core with the coating composition can be achieved in part by a process for producing powdered coatings, such as use of a rotating drum, powder sprays, or fluidized beds.

In one aspect of the present invention, a method of producing a fertilizer blend is disclosed. The method can include combining the coated fertilizer disclosed herein with one or more additional fertilizer(s), secondary nutrient(s), trace element(s), plant protection agent(s), and/or filler(s). The core can be coated at ambient temperature, at 15° C. to 30° C., at 15° C. to 35° C., or at 15° C. to 50° C. In some instances, the coating is formed as a single layer.

In one aspect of the present invention, disclosed is a method of fertilizing. The method can include applying the coated fertilizer disclosed herein to at least one of a soil, an organism, a crop, a liquid carrier, a liquid solvent, or a combination thereof. Application of the coated fertilizer can promote plant growth and/or plant health.

Also disclosed are the following Aspects 1 to 20 of the present invention.

Aspect 1 is a coated fertilizer comprising: a fertilizer core comprising a urea-based fertilizer; and a powder coating in direct contact with at least a portion of the surface of the fertilizer core, wherein the powder coating comprises magnesium oxide, a urease inhibitor, and a superphosphate.

Aspect 2 is the coated fertilizer of aspect 1, wherein the fertilizer core comprises 50 wt. % or more, based on the total weight of the core, of the urea-based fertilizer.

Aspect 3 is the coated fertilizer of any one of aspects 1 to 2, wherein the fertilizer core consists of the urea-based fertilizer.

Aspect 4 is the coated fertilizer of any one of aspects 1 to 3, wherein the urea-based fertilizer is urea.

Aspect 5 is the coated fertilizer of any one of aspects 1 to 4, wherein the magnesium oxide, urease inhibitor, and/or superphosphate are particles with a mean average diameter of 20 microns to 40 microns.

Aspect 6 is the coated fertilizer of any one of aspects 1 to 5, wherein the urease inhibitor is N-(n-butyl) thiophosphoric triamide, or phenylphosphorodiamidate, or any combination thereof.

Aspect 7 is the coated fertilizer of any one of aspects 1 to 6, wherein the urease inhibitor is N-(n-butyl) thiophosphoric triamide.

Aspect 8 is the coated fertilizer of any one of aspects 1 to 7, wherein the superphosphate is single superphosphate or triple superphosphate, or a combination thereof.

Aspect 9 is the coated fertilizer of any one of aspects 1 to 8, wherein the powder coating consists of magnesium oxide, the urease inhibitor, and the superphosphate.

Aspect 10 is the coated fertilizer of any one of aspects 1 to 9, comprising a sufficient amount of the magnesium oxide and the superphosphate in the powder coating to decrease degradation of the urease inhibitor as compared to the fertilizer core coated with only magnesium oxide and the urease inhibitor, or coated with only the urease inhibitor and the superphosphate.

Aspect 11 is the coated fertilizer of any one of aspects 1 to 10, wherein the powder coating comprises a weight ratio of 3:1 to 6:1 of the magnesium oxide to the superphosphate.

Aspect 12 is the coated fertilizer of any one of aspects 1 to 11, wherein the powder coating comprises a weight ratio of greater than 20:1 to 30:1 of the magnesium oxide to the urease inhibitor and/or a weight ratio of 3:1 to 6:1 of the superphosphate to the urease inhibitor.

Aspect 13 is the coated fertilizer of any one of aspects 1 to 12, wherein the fertilizer core is coated with a single layer of the powder coating.

Aspect 14 is the coated fertilizer of any one of aspects 1 to 13, wherein at least 50%, 70%, or 90%, or more of the surface of the fertilizer core is coated with the powder coating.

Aspect 15 is a fertilizer blend or a compounded fertilizer comprising the coated fertilizer of any one of aspects 1 to 14 and an additional fertilizer.

Aspect 16 is a method for producing a coated fertilizer of any one of aspects 1 to 14, the method comprising combining: a urea-based fertilizer core; and a powder coating composition comprising magnesium oxide particles, a urease inhibitor, and superphosphate particles, under conditions sufficient to form a coating of the powder coating composition on at least a portion of the surface of the fertilizer core.

Aspect 17 is the method of aspect 16, wherein the coating is formed on the urea-based fertilizer core at ambient temperature, preferably 15° C. to 50° C.

Aspect 18 is the method of any one of aspects 16 to 17, wherein the coating on the fertilizer core is formed as a single layer.

Aspect 19 is the method of any one of aspects 16 to 18, further comprising combining the coated fertilizer with one or more additional fertilizers to obtain a fertilizer blend or a compounded fertilizer.

Aspect 20 is a method of fertilizing, the method comprising applying the coated fertilizer of any one of aspects 1 to 14 or the fertilizer blend or the compounded fertilizer of aspect 15 to at least one of a soil, a crop, or a soil and a crop.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors. In some particular instances, the fertilizer is urea, such as urea granules.

The terms "about," "approximately," and "substantially" are defined as being close to, as understood by one of ordinary skill in the art. In one non-limiting instance, the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component. In a non-limiting example, 10 grams of a component in 100 grams of the material that includes the component is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The compositions and process of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the coated fertilizer of the present invention is that the coated fertilizer contains a fertilizer core containing a urea-based fertilizer, the fertilizer core coated with a powder coating containing magnesium oxide, a urease inhibitor, and a superphosphate.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes, combinations, and modifications within the spirit and scope of the invention will become apparent to those skilled in the art from this detailed description.

BRIEF DESCRIPTION OF THE DRAWINGS

Advantages of the present invention may become apparent to those skilled in the art with the benefit of the following non-limiting detailed description and upon reference to the accompanying non-limiting drawings. The drawings may not be to scale.

DETAILED DESCRIPTION OF THE INVENTION

Figure 1:
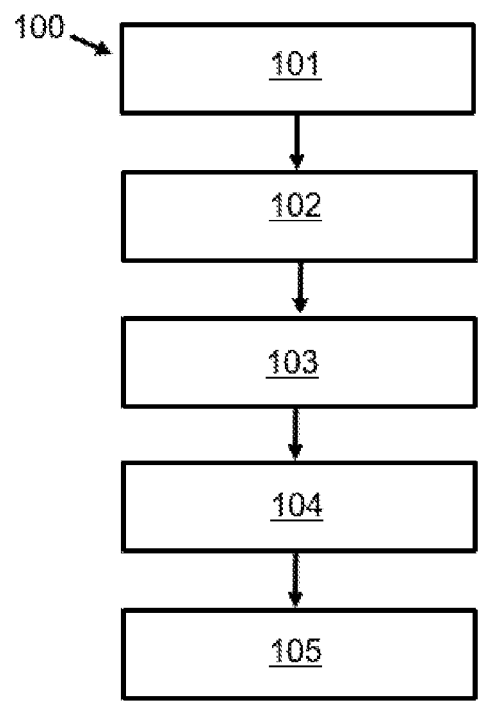
FIG. 1 is a schematic diagram depicting an exemplary method of producing a non-limiting embodiment of a coated fertilizer of the present invention.

The coated fertilizer of the present invention provides an elegant solution to problems associated with currently available fertilizers and urea-based compound containing fertilizers. Notably, the coated fertilizer of the present invention has desirable physical, chemical, and/or plant growth properties and can be produced, transported, and applied in a less complex, less costly, and more convenient manner when compared to known fertilizers. The coated fertilizer has a fertilizer core containing a urea-based fertilizer and a powder coating containing particles of magnesium oxide, particles of a urease inhibitor, and particles of a superphosphate. The coated fertilizer can provide greater stability, stability for longer periods of time, improved abrasion resistance, and additional nutrients not found in the individual ingredients alone. These nutrients can be provided in a single application by using the coated fertilizers described herein. The coating of the present invention provides inhibitor stability for much longer and under harsher conditions. The improved stability of the inhibitor in turn increases the availability of nitrogen to plants and uptake of said nitrogen into plants from the coated fertilizers. In addition, the coated fertilizer of the present invention can be produced in a process at room temperature and at temperatures that do not require high temperatures, such as the temperatures wherein urea melts (130 to 135° C.) or some ureases start to decompose (70° C.). The coated fertilizer of the present invention also does not require use of a slurry to coat the core. This reduces the caking tendency of urea and the other components of the coated fertilizer, such as the superphosphates. It also reduces the complexity of producing the coated fertilizer, as liquid handling is reduced and contaminated water production is decreased.

These and other non-limiting aspects of the present invention are discussed in further detail in the following sections with reference to the Figures.

A. Urea-Based Fertilizer Core with a Powder Coating Containing Magnesium Oxide, One or More Urease Inhibitor, and One or More Superphosphate 1. Urea-Based Fertilizer Core The coated fertilizer of the present invention can include a fertilizer core containing a urea-based fertilizer. The fertilizer of the core can be synthetically made. The urea-based fertilizer can be urea, a salt thereof, or an adduct thereof such as a urea calcium sulfate adduct or urea-formaldehyde. In some instances, the urea-based fertilizer is urea. The core can be a solid or semi solid at the time of coating the core or after coating the core.

In some embodiments, the core can contain at least 50 wt. % or more, based on the total weight of the core, of the urea-based fertilizer. The core can contain at least 55 wt. %, 60 wt. %, 65 wt. %, 70 wt. %, 75 wt. %, 80 wt. %, 85 wt. %, 90 wt. %, 95 wt. %, 100 wt. %, or any concentration therein of the urea-based fertilizer based on the total weight of the core.

In some preferred instances, the magnesium oxide particles, the one or more urease inhibitor particles, and the one or more superphosphate particles used in the powder coating are not included within the core matrix; rather, the magnesium oxide particles, one or more urease inhibitor particles, and one or more superphosphate particles are contained only on the surface of the core and/or may only partially penetrate the core's surface (e.g., 10%, 20%, 30%, 40%, 50%, 60%, 70%, 80%, 90% or up to 100% of the surface area of the magnesium oxide particles, urease inhibitor particles, and/or superphosphate particles are not encompassed within the core matrix). A benefit of this is that the powder coating can reduce the amount of water coming into contact with the core over a period of time, thereby creating a slowed or delayed release of nutrients from the core.

2. Powder Coating Containing Magnesium Oxide, One or More Urease Inhibitor, and One or More Superphosphate The coated fertilizer of the present invention can include a powder coating containing magnesium oxide particles, one or more urease inhibitor particles, and one or more superphosphate particles.

The one or more urease inhibitor(s) can be, but are not limited to, N-(n-butyl) thiophosphoric triamide (NBTPT), phenylphosphorodiamidate (PPDA) or a combination thereof. The one or more superphosphate(s) can be, but are not limited to, single superphosphate (SSP), triple superphosphate (TSP), or a combination thereof.

The coating can contain or exclude additional ingredients. In some instances the coating optionally contains one or more binders, and/or one or more anticaking agents. In some instances, water contained in the coating can be less than 2% by weight of the coating and be considered a powder or dry coating. In some instances, the water content is less than 1.8 wt. %, 1.6 wt. %, 1.5 wt. %, 1.4 wt. %, 1.3 wt. %, 1.2 wt. %, 1.1 wt. %, 1.0 wt. %, 0.9 wt. %, 0.8 wt. %, 0.7 wt. %, 0.6 wt. %, 0.5 wt. %, 0.4 wt. %, 0.3 wt. %, 0.2 wt. %, or 0.1 wt. % of the weight of the coating. Non-limiting examples of binders include triple super phosphate (TSP), waxes such as paraffin wax, oils such as linseed oils and paraffin oils, flours and starches such as bleached wheat flour, gelatins, polymers, gaur gum, calcium lignosulfonate, plaster of paris, cellulose, gluten, colloidal silica, kaolin, bentonite, polyethylene glycol (PEG), polycaprolactone, low molecular weight polyvinyl acetate, polyacrylamide, polyacrylic acid, polyacrylonitrile, hydroxypropyl methylcellulose (HPMC), biodegradable polylactic acid, and other biodegradable polymeric material such as polylactic acid, poly(3-hydroxypropionic acid), polyvinyl alcohol, poly ε-caprolactone, poly (L-lactide), polybutylene succinate, and biodegradable starch based polymers. Non-limiting examples of anticaking agents include surfactants, amines, liquid carriers such as oil, and/or a URESOFT® product supplied by Kao Chemicals (Kao Corporation, Japan), such as URESOFT®-125.

The coating can include or exclude a preservative, insecticide, fungicide, fragrance, micronutrient, fertilizer, plant growth agent, nutrient, secondary nutrient, trace element, plant protection agent, filler, etc., or combination thereof. In some instances, the coating does not contain any additional ingredient. Non-limiting examples of micronutrients include magnesium, calcium, zinc, boron, manganese, sulfur, iron, copper, molybdenum, zinc oxide (ZnO), boric oxide ($B_2O_3$), triple superphosphate (TSP), and/or magnesium oxide (MgO). In some instances, the micronutrients may be present in the form of inorganic salts. Examples of plant protection agents include, but are not limited to, insecticides, fungicides, growth regulators, nitrification inhibitors, and any mixtures thereof. Examples of fillers include, but are not limited to, clay, peat, etc. Examples of other fertilizer ingredients are for example described in Ullmann's Encyclopedia of Industrial Chemistry, $5^{th}$ edition, 1987, Volume A10, pages 363 to 401, DE-A-41 28 828, DE-A-19 05 834, or DE-A-196 31 764, which are hereby incorporated by reference.

It is contemplated that the compositions of the present invention can include any amount of the ingredients discussed in this specification. The compositions can also include any number of combinations of additional ingredients described throughout this specification. The concentrations of any ingredient within the compositions can vary. In non-limiting embodiments, for example, the compositions can comprise, consist essentially of, or consist of, in their final form, for example, at least about 0.0001%, 0.0010%, 0.0020%, 0.0030%, 0.0040%, 0.0050%, 0.0060%, 0.0070%, 0.0080%, 0.0090%, 0.0100%, 0.0200%, 0.0300%, 0.0400%, 0.0500%, 0.0600%, 0.0700%, 0.0800%, 0.0900%, 0.1000%, 0.2000%, 0.3000%, 0.4000%, 0.5000%, 0.6000%, 0.7000%, 0.8000%, 0.9000%, 1.0%, 2.0%, 3.0%, 4.0%, 5.0%, 6.0%, 7.0%, 8.0%, 9.0%, 10%, 20%, 30%, 35%, 40%, 45%, 50%, 60%, 65%, 70%, 75%, 80%, 85%, 90%, 95%, 99%, 100%, or any range or concentration derivable therein, of at least one of the ingredients that are mentioned throughout the specification and claims. In non-limiting aspects, the percentage can be calculated by weight or volume of the total composition or coated fertilizer. A person of ordinary skill in the art would understand that the concentrations can vary depending on the addition, substitution, and/or subtraction of ingredients in a given composition.

It is contemplated that the coated fertilizer of the present invention can contain a coating in any amount, volume, thickness, coverage of the fertilizer core surface, etc. In some instances, the coating is 0.001 wt. % to 10 wt. %, 0.001 wt. % to 9 wt. %, 0.001 wt. % to 8 wt. %, 0.001 wt. % to 7 wt. %, 0.001 wt. % to 6 wt. %, 0.01 wt. % to 10 wt. %, 0.1 wt. % to 10 wt. %, 0.5 wt. % to 10 wt. %, 0.5 wt. % to 9 wt. %, 0.5 wt. % to 8 wt. %, 0.5 wt. % to 7 wt. %, 0.5 wt. % to 6 wt. %, 1 wt. % to 6 wt. %, 2 wt. % to 6 wt. %, 2 wt. % to 5 wt. %, 2 wt. % to 4 wt. %, or any range therein, of the coated fertilizer based on the total weight of the coated fertilizer, or any range therein. In some aspects, at least a portion of the fertilizer core's surface can be in direct contact with the coating. In some instances, the coating is not dispersed throughout the fertilizer core. In some instances, the coating forms a shell at least partially coating the core. The coating can coat at least 55%, 60%, 65%, 70%, 75%, 80%, 85%, 90%, 95%, or 100% or more of the surface of the core. The core can be coated by the coating so that dissolution of water into the core is decreased as compared to the core without the coating. In some instances, the coating has a mean average thickness of 2 to 100 microns, 10 to 80 microns, 20 to 80 microns, or 20 to 40 microns, or any range or thickness therein.

3. Blended or Compounded Fertilizers

The coated fertilizer of the present invention can be included with other fertilizers in a fertilizer composition. In some instances, the coated fertilizer is contained in a blended fertilizer composition or a compounded fertilizer. Additional fertilizers can be chosen based on the particular needs of certain types of soil, climate, or other growing conditions to maximize the efficacy of the blended composition in enhancing plant growth and crop yield. The coated fertilizers herein can be blended with other fertilizer at any concentration. In some instances, the desired concentration is sufficient to meet the required nutrient or micronutrient content in the blend. By way of example, a blended fertilizer composition of the present invention can be formulated into a quick release fertilizer. Alternatively, the blended fertilizer composition can be formulated into a slow-release fertilizer. In some instances, the blended fertilizer composition is formulated into a specialty fertilizer.

B. Method of Making the Coated Fertilizer

With reference to FIG. 1, a non-limiting method (100) of making a coated fertilizer can include obtaining (101) a urea-based fertilizer core, powdered magnesium oxide, a powdered urease inhibitor, a powdered superphosphate, and optionally powdered additives. In some instances, the magnesium oxide, a urease inhibitor, a superphosphate, and optional additives are mixed (102) to form a powder coating composition. The ingredients can be mixed at ambient temperatures (e.g., 15° C. to 50° C.) or temperatures below 35° C. or below 30° C. Optionally, one or more of the ingredients mixed can be heated during mixing or pre-heated before mixing. In some instances, the ingredients are heated to room temperature or up to 90° C. or more. If additional ingredients are included, the additional ingredients can be added at any time in the production of the coated fertilizer and/or can be added after the coated fertilizer is formed. Mixing can be performed by processes such as stirring, vortexing, homogenizing, shaking, pouring, etc.

The method (100) can include coating (103) the urea-based fertilizer core with the magnesium oxide, urease inhibitor, superphosphate, and/or coating composition. The magnesium oxide, urease inhibitor, superphosphate, or coating composition can be applied to the core by a variety of methods, such as spraying, pouring, mixing, blending, fluidizing, agitating, etc. A dry fluid bed sprayer or coater, a dry mixer, a rotating drum or pan, powder spray coating at discharge point, a paddle mixer, etc. can be used. In one non-limiting instance, the equipment and methods used in the Examples can be used.

In some instances, the magnesium oxide, urease inhibitor, superphosphate, and/or coating composition is applied to the core and can form a coating at ambient temperature, such as at 15° C. to 50° C., or more preferably at 15° C., 20° C., 25° C., 30° C., or up to 35° C. In some instances, optionally, the magnesium oxide, urease inhibitor, superphosphate, and/or coating composition is heated (104) while on the fertilizer core to form a powder coating on the fertilizer core. However, in some instances, no heating above 35° C. is needed to form a powder coating. The coated fertilizer can be heated by any means known, including exposure to ambient air, heated sweep gas, unheated sweep gas, heat, etc. If more than one layer is desired, the core coated can then be coated with a second, third, fourth, or more layers of magnesium oxide, urease inhibitor, superphosphate, and/or coating composition during or after the first coating is applied on the core (not shown). For each layer, the amount of time used to apply the coating can be an amount sufficient to ensure that a substantially even layer is formed on the core and/or formed on the subsequent layer. In some instances, the application times can include 5 minutes, 10 minutes, 30 minutes, 1, hour, 2 hours, 3 hours, 4 hours, 5 hours, or more or any range therein (e.g., 5 minutes to 5 hours, 5 minutes to 1 hour, etc.). In some instances, the ingredients are heated to room temperature or up to 90° C. or more.

The method (100) can include optionally combining (105) additional fertilizers with the coated fertilizer to form a blended or compounded fertilizer. Combining can be performed by any type of blending or mixing apparatus generally available in the art (e.g., WJ-700, WJ-900, or WJ-1000 Mixing Machines from Whirlston Machinery (Zhengzhou, China). Once combined, the fertilizer blend can be stored for future use or sale.

Figure 2:
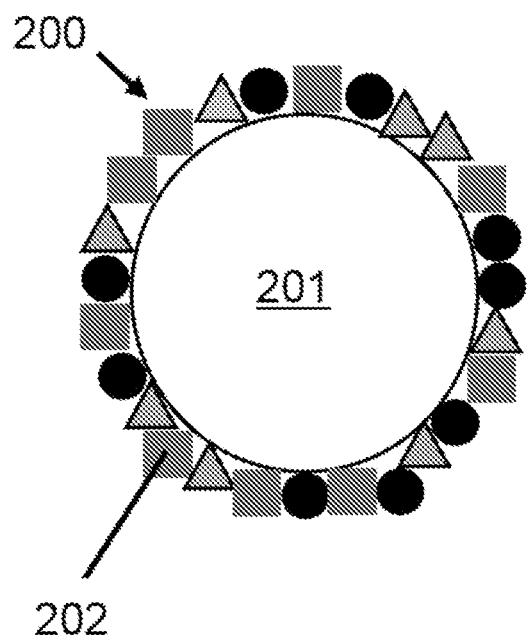
FIG. 2 is a non-limiting symbolized representation of a cross-section of a fertilizer core containing a urea-based fertilizer that is coated by a powder coating containing magnesium oxide particles, urease inhibitor particles, and superphosphate particles.

Referring to FIG. 2, the produced coated fertilizer (200) can include a fertilizer core (201) and a powdered coating (202) comprising particles of magnesium oxide, particles of urease inhibitor, particles of superphosphate, and optionally particles of additives (not shown). In the illustration, and for illustrational purposes only, particles of magnesium oxide in the powdered coating have a circular cross section, particles of urease inhibitor have a triangle cross section, and particles of superphosphate have a square cross section. The shapes, sizes, and relative numbers of the components in the illustration are used to assist in easily distinguishing the different components in the coated fertilizer and are non-limiting. Other shapes, sizes, and relative numbers of components are contemplated and can readily be made. In this embodiment, the coating (202) is on the outer surface of the core (201) and is not present or distributed throughout the core's matrix/internal volume. Further, in some instances, magnesium oxide, urease inhibitors, and superphosphates are not present in the core's matrix and is only present in the outer coating.

The coated fertilizer can be produced in a batch or continuous process. In some instances, the coated fertilizer is produced on an industrial scale. In some instances, the coated fertilizer is produced at 1 kg/hour, or less, or up to 10,000 kg/hour, or more.

C. Use of the Fertilizer Compositions

In some instances, the coated fertilizer of the present invention can be used as a fertilizer. The coated fertilizer can be used alone, in a combined fertilizer blend, or with additional separate fertilizers. The coated fertilizer can be used in a method of fertilizing. The method can include applying a fertilizer composition to at least one of a soil, an organism, a liquid carrier, a liquid solvent, or a combination thereof.

Non-limiting examples of plants that can benefit from the fertilizer of the present invention include vines, trees, shrubs, stalked plants, ferns, etc. The plants may include orchard crops, ornamental plants, food crops, timber, and harvested plants. The plants may include Gymnosperms, Angiosperms, and/or Pteridophytes.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Example 1

(Production of Urea-Based Fertilizer Core with a Powder Coating Containing Magnesium Oxide, Urease Inhibitor, and Superphosphate)

Described below are non-limiting examples of production of a urea-based fertilizer core with a powder coating containing magnesium oxide, urease inhibitor, and superphosphate. Urea cores were coated with a powdered coating composition containing powdered magnesium oxide (MgO) (20 micron particle size), powdered single super phosphate (SSP) (20 micron particle size), and powdered NBTPT (20 micron particle size). See Table 1 for the coated fertilizer formulations prepared for analysis in the Examples. A powdered coating composition described above was also tested without the urea core.

For a lab scale production, briefly, a weighed quantity of urea fertilizer particles to be coated were added in a tumbling drum mixer with a 50-liter capacity. The weighed quantities of coating material: SSP/TSP powder, MgO powder, and NBTPT inhibitor powder, which had been pre mixed in a 500 ml plastic container thoroughly for 10-15 min., was added to the tumbling drum mixer over the urea fertilizer particles to be coated. The coating material and fertilizer particles to be coated were mixed at a drum speed of 30 to 50 rpm for less than 30 minutes at ambient temperature. After mixing, excess coating powder was separated by sieving and the inhibitor coated fertilizer particles were stored in a bag or containers.

It was observed that a firm coating is developed on urea-based fertilizer cores with the formulation mentioned above. Not to be bound by theory, it is believed that the reason the fine powders of the coating (e.g., MgO, SSP, and NBTPT) form a firm coating is due at least in part to the powder particles being held firmly in the interstices of the core's surface.

TABLE 1

(Formulations Prepared for Testing)

| Sample No. | Urea (g) | MgO (g) (2.4 wt. % to Urea) | SSP (g) (0.5 wt. % to Urea) | Inhibitor (g) (wt. % compared to composition) | Comment |
|---|---|---|---|---|---|
| 1 | — | 2.88 | 0.6 | 0.12 (3.33%) | Powder |
| 2 | — | 2.88 | — | 0.12 (4%) | Powder |
| 3 | — | — | 0.6 | 0.12 (16.66%) | Powder |
| 4 | — | — | — | 0.12 (100%) | Powder |
| 5 | 60 | 1.44 | 0.3 | 0.06 (0.097%) | Coated Urea |
| 6 | 60 | 1.44 | — | 0.06 (0.098%) | Coated Urea |
| 7 | 60 | — | 0.3 | 0.06 (0.1%) | Coated Urea |
| 8 | 1000 | 25 | 5 | 0.92 (0.09%) | Coated urea |

Example 2

(Characterization of Coated Fertilizers and Coating Compositions)

Coated fertilizers and coating compositions of Example 1 were evaluated for abrasion and inhibitor stability. All of the physical property measurements were performed using standard protocols (e.g., from fertilizer manuals) and described briefly in the following sections. It is expected that fertilizers substituting TSP or a mixture of TSP and SSP for the SSP in the formulations of Table 1 will have similar properties due at least in part to the similar properties and reactivity between SSP and TSP. For example, both SSP and TSP are acidic in nature and contain mono calcium phosphate.

The abrasion test shown abrasion within the prescribed limit as mentioned in the IFDC manual for measuring physical properties of fertilizers. This indicates abrasion resistance to the formation of dust and fines as a result of granule-to-granule and granule-to-equipment contact.

Stability of the inhibitor was initially tested in the powder mix of coating formulations. The inhibitor degradation was very high when SSP alone was used (Sample No. 3 in Table 1 and 2); whereas very low degradation was observed when both MgO and SSP were combined together (Sample No. 2 in Table 1 and 2).

The coated fertilizers retained a significant amount of urease inhibitor without degradation even after 4 to 5 months of storage under two different environmental conditions: 1) 40° C. and relative humidity of 75%; and 2) 23 to 26° C. ambient lab conditions.

Abrasion Test: The abrasion test is used to indicate adhesion of coating material on the fertilizer core. The IFDC S-116 method, as described in the manual for determining physical properties of fertilizer by IFDC 1986 "Abrasion Resistance (Rotary-Drum Method)" was used. Briefly, a 100 cm³ portion of sieved granules ranging in size of 1 to 3.35 mm was weighed (W1) and placed into a test drum along with 100 grams of stainless steel balls measuring 7.9 mm in diameter. The drum was closed and rotated for 5 min at 30 rpm. Then, the steel balls were separated from the sample and the material was screened through a 1 mm sieve for 5 minutes using a Ro-Tap shaker. The material that did not pass through the sieve (granules over 1 mm) was weighed (W2). Results were calculated in terms of % weight loss due to abrasion by dividing the weight of the material lost (W1-W2) by W1 and multiplying by 100:

$$\text{Weight loss (wt. \%)} = \frac{W1 - W2}{W1} \times 100$$

It was determined that most of the coated urea granules had an acceptable abrasion value of approximately 0.43%, indicating good adhesion of the coating material on the fertilizer core. IFDC typical values for granular uncoated urea is 2.3%, so the coating decreased the losses of the fertilizer caused by abrasion.

Inhibitor Stability Test: The stability test is used to indicate changes in stability of the urease inhibitor in different coated fertilizers or coating compositions under multiple conditions for different amounts of time. HPLC analysis was used to determine the amount of non-degraded inhibitor remaining at the end of the testing periods. Briefly, for the HPLC analysis procedure, approximately 4 grams of a sample and 20 ml of diluent was added into a 50 ml polypropylene tube. The sample was sonicated for 30 minutes with intermediate shaking and then vortexed for 1 hour using a vortex shaker. After vortexing, the sample was filtered using a 0.45µ syringe filter into a HPLC vial and injected into the HPLC.

Chromatographic Conditions:
  Column: Phenomenex, Luna 5u Pnenyl hexyl 250*4.6, 5µ
  Column oven temperature: 350° C.
  Injection Vol.: 5 µL
  Flow rate: 1.00 mL/min
  Mobile Phase: Reservoir A—Milli Q Water; Reservoir C—Acetonitrile; Isocratic—Milli Q water/Acetonitrile (80:20% v/v)
  Run Time: 15 minutes
  Wavelength: 207 nm
  Calculation: Calibration standards were injected in duplicate and the calibration curve for NBTPT was constructed by plotting the concentration (mg/mL) in X-axis and Instrument response (area) in the Y-axis. The unknown concentrations of NBTPT in the samples were calculated using the formula y=mx+c with the appropriate dilution factor applied. The formula variables were:
    y=Area
    x=Concentration
    m=Slope
    c=Intercept The appropriate dilution factor was applied to calculate the concentration of NBTPT in the unknown samples.

Figure 3:
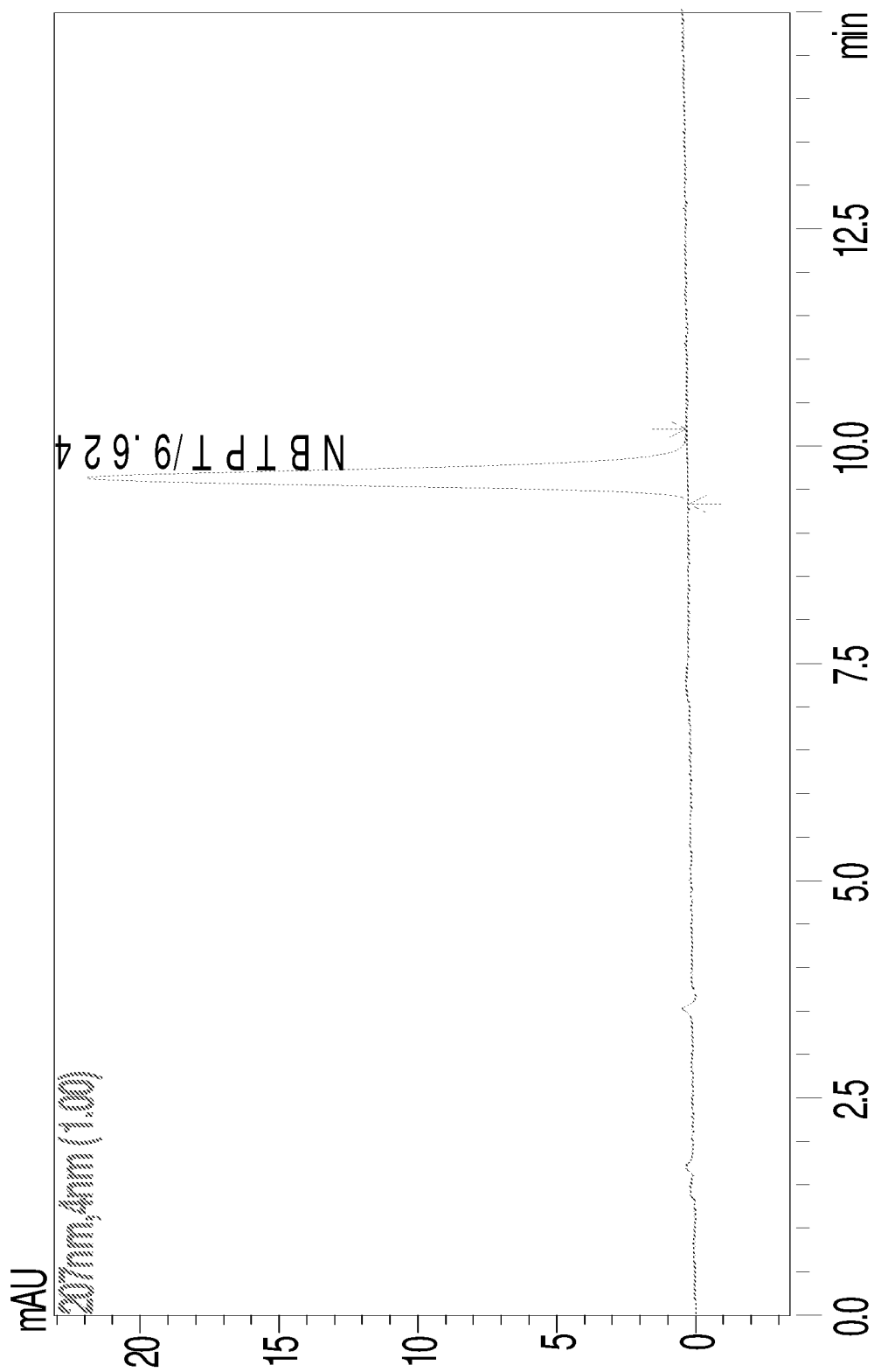
FIG. 3 is a representative chromatogram of n-butyl thiophosphoric triamide calibration standard.
Figure 4:
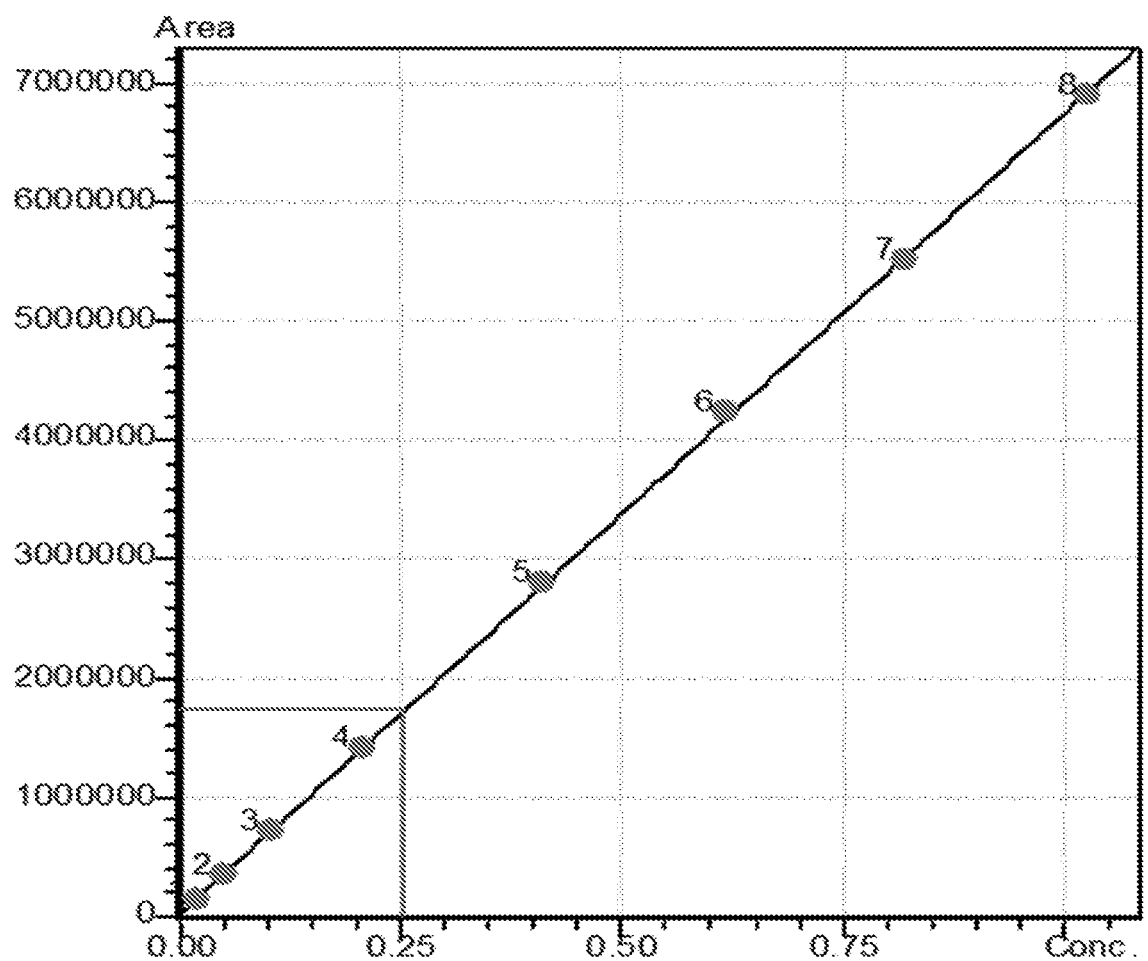
FIG. 4 is a representative calibration curve for n-butyl thiophosphoric triamide.

Representative chromatogram of n-butylthiophosphoric triamide calibration standard is shown in FIG. 3 and a representative calibration curve is shown in FIG. 4.

The results of the tests for the samples of Table 1 are shown in Table 2. As is shown, urea coated with SSP powder, MgO powder, and NBTPT powder, Sample Nos. 8 and 5, had reduced NBTPT degradation when compared to coated urea fertilizers lacking either SSP or MgO in the coating, Sample Nos. 6 and 7. Further, the coated urea fertilizers containing SSP powder, MgO powder, and NBTPT powder even retained 50% or more of the NBTPT for 120 days under room temperature or under harsher conditions (40° C. and 75% relative humidity).

It was determined that the urea fertilizers coated with SSP powder, MgO powder, and NBTPT powder tested here had greater stability, longer term stability, and stability under harsher conditions than that reported by others for fertilizer blends containing combinations of granules of inhibitors (coated or un coated) and granules of urea (coated or uncoated). See WO 2017/081183.

TABLE 2

(NBTPT Degradation in Formulations)

% NBTPT Degradation
(RT = Room Temp. (23 to 26° C.); RH = Relative Humidity; — = Not Tested)

| Sample No. | 2 weeks | | 60 days | | 90 days | | 120 days | |
|---|---|---|---|---|---|---|---|---|
| | RT | 40° C., 75% RH | RT | 40° C., 75% RH | RT | 40° C., 75% RH | RT | 40° C., 75% RH |
| 1 | 2.5 | — | — | — | — | — | — | — |
| 2 | 6 | — | — | — | — | — | — | — |
| 3 | 100 | — | — | — | — | — | — | — |

TABLE 2-continued (NBTPT Degradation in Formulations)

% NBTPT Degradation
(RT = Room Temp. (23 to 26° C.); RH = Relative Humidity; — = Not Tested)

| Sample No. | 2 weeks | | 60 days | | 90 days | | 120 days | |
|---|---|---|---|---|---|---|---|---|
| | RT | 40° C., 75% RH | RT | 40° C., 75% RH | RT | 40° C., 75% RH | RT | 40° C., 75% RH |
| 4 | 0 | — | — | — | — | — | — | — |
| 5 | 7 | — | — | — | — | — | — | — |
| 6 | 18 | — | — | — | — | — | — | — |
| 7 | 90 | — | — | — | — | — | — | — |
| 8 | 10 | 33 | 30 | 40 | 40 | 40 | 40 | 50 |

The invention claimed is:

1. A coated fertilizer comprising:
  a fertilizer core comprising a urea-based fertilizer; and
  a powder coating in direct contact with at least a portion of the surface of the fertilizer core, wherein the powder coating comprises magnesium oxide, a urease inhibitor, and a superphosphate.

2. The coated fertilizer of claim 1, wherein the fertilizer core comprises 50 wt. % or more, based on the total weight of the core, of the urea-based fertilizer.

3. The coated fertilizer of claim 1, wherein the fertilizer core consists of the urea-based fertilizer.

4. The coated fertilizer of claim 1, wherein the urea-based fertilizer is urea.

5. The coated fertilizer of claim 1, wherein the magnesium oxide, urease inhibitor, and/or superphosphate are particles with a mean average diameter of 20 microns to 40 microns.

6. The coated fertilizer of claim 1, wherein the urease inhibitor is N-(n-butyl) thiophosphoric triamide, or phenylphosphorodiamidate, or any combination thereof.

7. The coated fertilizer of claim 1, wherein the urease inhibitor is N-(n-butyl) thiophosphoric triamide.

8. The coated fertilizer of claim 1, wherein the superphosphate is single superphosphate or triple superphosphate, or a combination thereof.

9. The coated fertilizer of claim 1, wherein the powder coating consists of magnesium oxide, the urease inhibitor, and the superphosphate.

10. The coated fertilizer of claim 1, comprising a sufficient amount of the magnesium oxide and the superphosphate in the powder coating to decrease degradation of the urease inhibitor as compared to the fertilizer core coated with only magnesium oxide and the urease inhibitor, or coated with only the urease inhibitor and the superphosphate.

11. The coated fertilizer of claim 1, wherein the powder coating comprises a weight ratio of 3:1 to 6:1 of the magnesium oxide to the superphosphate.

12. The coated fertilizer of claim 1, wherein the powder coating comprises a weight ratio of greater than 20:1 to 30:1 of the magnesium oxide to the urease inhibitor and/or a weight ratio of 3:1 to 6:1 of the superphosphate to the urease inhibitor.

13. The coated fertilizer of claim 1, wherein the fertilizer core is coated with a single layer of the powder coating.

14. The coated fertilizer of claim 1, wherein at least 50%, 70%, or 90%, or more of the surface of the fertilizer core is coated with the powder coating.

15. The coated fertilizer of claim 1, wherein the urease inhibitor is N-(n-butyl) thiophosphoric triamide and the superphosphate is single superphosphate, triple superphosphate, or single superphosphate and triple superphosphate.

16. A method for producing a coated fertilizer of claim 1, the method comprising combining:
  a urea-based fertilizer core; and
  a powder coating composition comprising magnesium oxide particles, a urease inhibitor, and superphosphate particles,
  under conditions sufficient to form a coating of the powder coating composition on at least a portion of the surface of the fertilizer core.

17. The method of claim 16, wherein the coating is formed on the urea-based fertilizer core at 15° C. to 50° C.

18. The method of claim 16, wherein the coating on the fertilizer core is formed as a single layer.

19. The method of claim 16, further comprising combining the coated fertilizer with one or more additional fertilizers to obtain a fertilizer blend or a compounded fertilizer.

20. A method of fertilizing, the method comprising applying the coated fertilizer of claim 1 to at least one of a soil, a crop, or a soil and a crop.

* * * * *